US012766921B2

(12) United States Patent
Matsumoto

(10) Patent No.: US 12,766,921 B2
(45) Date of Patent: Oct. 20, 2026

(54) VEHICLE AIR CONDITIONING SYSTEM

(71) Applicant: SUBARU CORPORATION, Tokyo (JP)

(72) Inventor: Koki Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 126 days.

(21) Appl. No.: 18/829,432

(22) Filed: Sep. 10, 2024

(65) Prior Publication Data

US 2025/0108678 A1 Apr. 3, 2025

(30) Foreign Application Priority Data

Sep. 29, 2023 (JP) ................................ 2023-169559

(51) Int. Cl.
*B60H 1/00* (2006.01)

(52) U.S. Cl.
CPC ..... *B60H 1/00892* (2013.01); *B60H 1/00742* (2013.01)

(58) Field of Classification Search
CPC ........................ B60H 1/00892; B60H 1/00742
See application file for complete search history.

(56) References Cited

U.S. PATENT DOCUMENTS

2004/0129007 A1* 7/2004 Tomita ............... B60H 1/00864 62/157
2013/0232996 A1* 9/2013 Goenka ............. B60H 1/00742 62/3.61
2019/0308633 A1 10/2019 Hori et al.
2020/0172034 A1* 6/2020 Rowe .................. B60R 16/0237

FOREIGN PATENT DOCUMENTS

CN 115366604 A * 11/2022
JP 2019-182096 A 10/2019

OTHER PUBLICATIONS

Feng, Vehicle Control Method and System, Nov. 22, 2022, CN115366604A, Whole Document (Year: 2022).*

* cited by examiner

*Primary Examiner* — Larry L Furdge
(74) *Attorney, Agent, or Firm* — TROUTMAN PEPPER LOCKE LLP

(57) ABSTRACT

A vehicle air conditioning system includes an air conditioner unit, a temperature sensor, a detection device, a storage, and a controller. The temperature sensor detects a current outside air temperature of a vehicle. The detection device detects an occupant of the vehicle. The storage stores characteristic data that is generated for the occupant and that includes clothing level data and a setting temperature of the air conditioner unit corresponding to outside air temperature data. The controller calculates a clothing level of the occupant, compares the calculated clothing level with the clothing level data that is referred to and that corresponds to the outside air temperature data including the outside air temperature which is input from the temperature sensor, and controls driving of the air conditioner unit by referring to, from the characteristic data, the setting temperature corresponding to the clothing level data including the clothing level.

18 Claims, 9 Drawing Sheets

FIG. 8

25

| OUTSIDE AIR TEMPERATURE DATA Tr (°C) | CLOTHING LEVEL DATA CLr | SETTING TEMPERATURE Pt (°C) |
|---|---|---|
| 9 OR LESS | 5 | 28 |
| 10 TO 15 | 5 TO 4 | 27 |
| 16 TO 20 | 4 TO 3 | 24 |
| 21 TO 25 | 3 TO 2 | 22 |
| 26 TO 29 | 2 TO 1 | 20 |
| 30 OR MORE | 1 | 18 |

FIG. 9

26

| OUTSIDE AIR TEMPERATURE DATA Tr (°C) | CLOTHING LEVEL DATA CLr | SETTING TEMPERATURE Pt (°C) |
|---|---|---|
| 9 OR LESS | 5 | 26 |
| 10 TO 15 | 4 | 25 |
| 16 TO 20 | 4 TO 3 | 24 |
| 21 TO 25 | 3 TO 2 | 22 |
| 26 TO 29 | 2 TO 1 | 20 |
| 30 OR MORE | 1 | 20 |

VEHICLE AIR CONDITIONING SYSTEM

CROSS-REFERENCE TO RELATED APPLICATION

The present application claims priority from Japanese Patent Application No. 2023-169559 filed on Sep. 29, 2023, the entire contents of which are hereby incorporated by reference.

BACKGROUND

The present disclosure relates to a vehicle air conditioning system that controls a vehicle air conditioner.

A vehicle such as an automobile is provided with the vehicle air conditioning system. The vehicle air conditioning system controls the vehicle air conditioner such that a vehicle interior temperature reaches a setting temperature that is set by an occupant such as a driver who drives the vehicle.

In recent years, a vehicle having a function of specifying the occupant by an occupant authentication device such as a driver monitoring system has emerged. Also, a vehicle having a so-called personalized function of authenticating the occupant and reading various parameters that are set last time when the occupant boards the vehicle has emerged.

For example, as disclosed in Japanese Unexamined Patent Application Publication No. 2019-182096, an in-vehicle environment setting system that is known as such a personalized function of the vehicle learns the vehicle interior temperature and an air volume to be set based on an outside air temperature, humidity, and weather.

SUMMARY

An aspect of the disclosure provides a vehicle air conditioning system for a vehicle. The vehicle air conditioning system includes an air conditioner unit, a temperature sensor, a detection device, a storage, and a controller. The temperature sensor is configured to detect an outside air temperature that is a current air temperature outside the vehicle. The detection device is configured to detect an occupant of the vehicle. The storage is configured to store characteristic data that is generated for the occupant and that includes clothing level data and a setting temperature of the air conditioner unit corresponding to outside air temperature data. The controller is configured to calculate a clothing level of the occupant detected by the detection device, compare the calculated clothing level with the clothing level data that is referred to from the characteristic data and that corresponds to the outside air temperature data including the outside air temperature which is input from the temperature sensor, and control driving of the air conditioner unit by referring to, from the characteristic data, the setting temperature corresponding to the clothing level data including the clothing level.

An aspect of the disclosure provides a vehicle air conditioning system for a vehicle. The vehicle air conditioning system includes an air conditioner, a temperature sensor, a detection device, a memory, and a processor. The temperature sensor is configured to detect an outside air temperature that is a current air temperature outside the vehicle. The detection device includes a camera and is configured to detect an occupant of the vehicle. The memory is configured to store characteristic data that is generated for the occupant and that includes clothing level data and a setting temperature of the air conditioner corresponding to outside air temperature data. The processor is configured to calculate a clothing level of the occupant detected by the detection device, compare the calculated clothing level with the clothing level data that is referred to from the characteristic data and that corresponds to the outside air temperature data including the outside air temperature which is input from the temperature sensor, and control driving of the air conditioner unit by referring to, from the characteristic data, the setting temperature corresponding to the clothing level data including the clothing level.

An aspect of the disclosure provides a vehicle air conditioning system including an air conditioner unit, a temperature sensor, a storage, and circuitry. The temperature sensor is configured to detect a current outside air temperature. The storage is configured to store characteristic data that is generated for an occupant and that includes clothing level data and a setting temperature of the air conditioner unit corresponding to outside air temperature data. The circuitry is configured to detect the occupant, calculate a clothing level of the occupant detected by the detection device, compare the calculated clothing level with the clothing level data that is referred to from the characteristic data and that corresponds to the outside air temperature data including the outside air temperature input from the temperature sensor, and control driving of the air conditioner unit by referring to, from the characteristic data, the setting temperature corresponding to the clothing level data including the clothing level.

BRIEF DESCRIPTION OF THE DRAWINGS

FIG. 8 is a table illustrating a characteristic map at an initial stage according to the aspect of the present disclosure;

FIG. 9 is a table illustrating a personalized characteristic map according to the aspect of the present disclosure;

DETAILED DESCRIPTION

The in-vehicle environment setting system of the related art sets the vehicle interior temperature and the air volume by learning a user's preference related to the setting of an in-vehicle environment, based on a surrounding environment such as the outside air temperature. However, in the in-vehicle environment setting system of the related art, there is a problem in that it is not possible to change the vehicle interior temperature in consideration of a difference in clothes being worn by the occupant.

It is desirable to provide a vehicle air conditioning system that changes the vehicle interior temperature in consideration of the clothes of the occupant at the time of boarding.

An embodiment of the present disclosure will be described below with reference to the drawings. A vehicle air conditioning system 1 according to the present embodiment illustrated in FIG. 1 is mounted on a vehicle such as an automobile.

Figure 1:
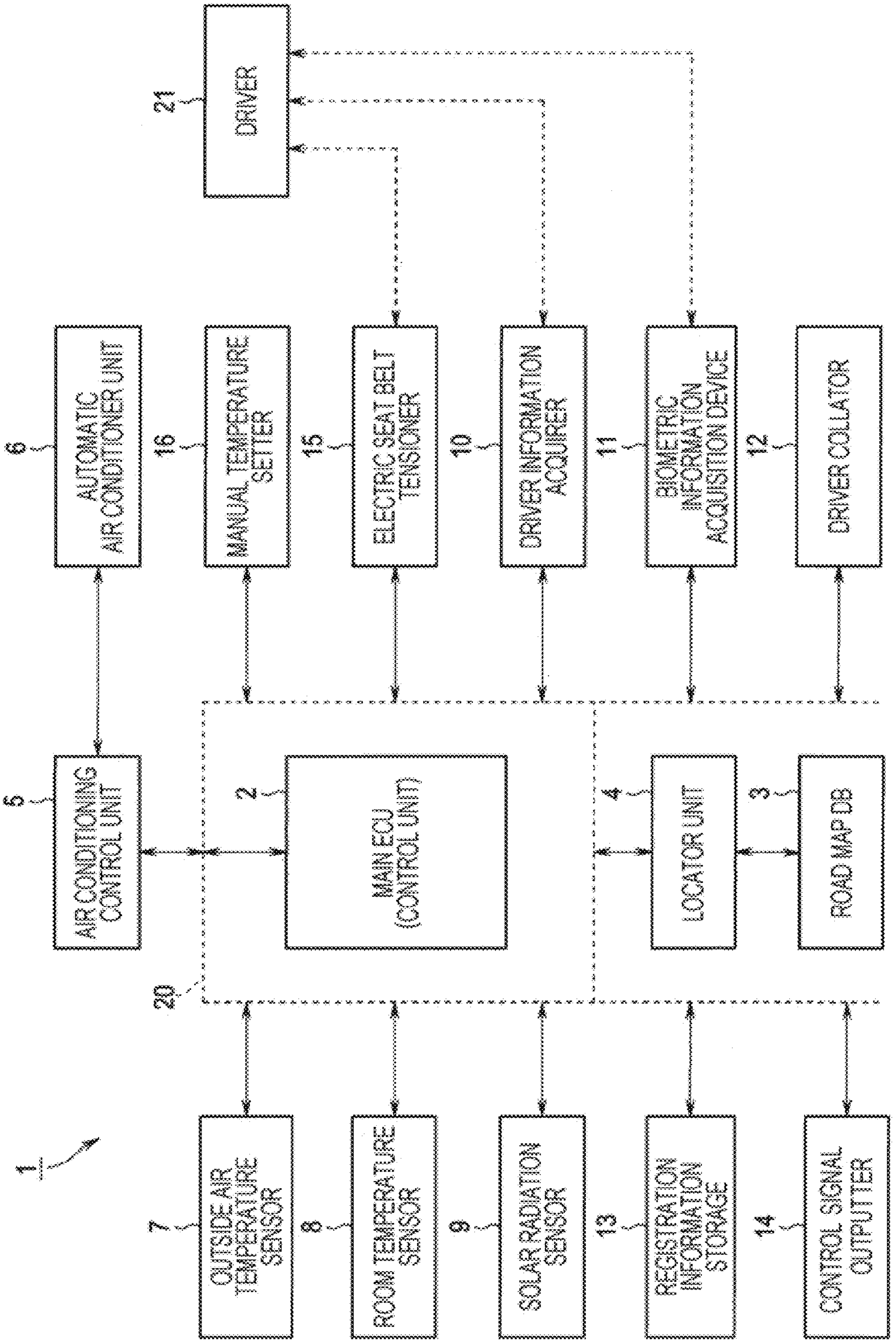
FIG. 1 is a block diagram illustrating a configuration of a vehicle air conditioning system according to an aspect of the present disclosure.

The vehicle air conditioning system 1 illustrated in FIG. 1 includes electrical components such as a main electronic control unit (ECU) 2, a high-precision road map database (road map DB) 3, a locator unit 4, an air conditioning control unit 5, and an air conditioner unit (automatic air conditioner unit) 6. The vehicle air conditioning system 1 illustrated in FIG. 1 further includes electrical components such as an outside air temperature sensor 7, a room temperature sensor 8, a solar radiation sensor 9, a driver information acquirer 10, a biometric information acquisition device 11, a control signal outputter 14, a registration information storage 13, a driver collator 12, an electric seat belt tensioner 15, and a manual temperature setter 16. These electrical components are coupled to each other by an in-vehicle communication line 20 such as a controller area network (CAN).

The main ECU 2, which is a control unit, transmits and receives a driving signal, a detection signal, a request signal, an instruction signal, and the like to and from the various components described above via the in-vehicle communication line 20. The main ECU 2 constitutes an electronic control unit including, for example, an information processor such as a central processing unit (CPU), a storage such as a random-access memory (RAM) or a read-only memory (ROM), an input/output interface, and the like.

The main ECU 2 transmits and receives various signals to and from the locator unit 4 coupled to the road map DB 3. The locator unit 4 includes a built-in a global navigation satellite system (GNSS) sensor (not illustrated). The locator unit 4 senses information from the road map DB 3 and the GNSS sensor and calculates a position of the vehicle.

The GNSS sensor receives positioning signals transmitted from positioning satellites. The main ECU 2 senses position information (latitude, longitude, altitude, and the like) of the vehicle from the positioning signals received by the GNSS sensor.

The road map DB 3 is a large-capacity storage medium such as a hard disk drive (HDD). The road map DB 3 stores high-precision road map information (dynamic map). Also, the road map DB 3 holds road map information of different countries, information on the altitude at a given position, and the like.

The road map DB 3 outputs various kinds of information measured by the GNSS sensor of the locator unit 4 to the locator unit 4, for example, based on the request signal from the main ECU 2. The locator unit 4 then outputs various kinds of information to the main ECU 2, such as the position information of the vehicle, the road map information, the altitude, and a date and time.

The main ECU 2 transmits and receives a signal to and from the air conditioning control unit 5. The air conditioning control unit 5 integrally controls the air conditioner unit 6. The air conditioning control unit 5 includes, for example, an information processor such as a CPU, a storage such as a RAM or a ROM, an input/output interface, a bus that couples these components, and the like.

The air conditioning control unit 5 performs mode control, target temperature setting, blower control, and the like. Based on a setting temperature that is set by an occupant such as a driver 21 who drives the vehicle, the air conditioning control unit 5 determines driving of a compressor, a blower, and the like (none of which are illustrated) according to detection values of the outside air temperature sensor 7, the room temperature sensor 8, and the solar radiation sensor 9, which will be described later.

In a normal time, the air conditioning control unit 5 controls the air conditioner unit 6 such that an actual vehicle interior temperature converges on the setting temperature early.

Since the air conditioner unit 6 has a well-known configuration, the components thereof will be briefly described below. The air conditioner unit 6 includes a target temperature setter and a heating, ventilation, and air conditioning (HVAC) unit (neither of which is illustrated).

The HVAC unit adjusts a temperature, an air volume, an outlet, and the like of air in order to keep the vehicle interior at the setting temperature.

The target temperature setter sets a target temperature at which the air to be blown into the vehicle interior by the HVAC unit has an appropriate temperature at the outlet. The target temperature setter also calculates an amount of heat absorbed by an evaporator (not illustrated).

From this calculation result, the target temperature setter estimates a temperature of an air flow downstream of the evaporator. The target temperature setter performs predetermined correction or the like on the estimated temperature. Then, the target temperature setter sets the target temperature for the air conditioner unit 6.

The air conditioner unit 6 includes a blower controller (not illustrated). The blower controller changes a blowing flow rate and a flow speed of the air flow from the HVAC unit in a continuous or stepwise manner. That is, the blower controller adjusts the output of the blower (not illustrated).

The main ECU 2 receives detection signals from the outside air temperature sensor 7, the room temperature sensor 8, and the solar radiation sensor 9.

The outside air temperature sensor 7 detects a current air temperature (outside air temperature T) outside the vehicle. The outside air temperature sensor 7 outputs a detection value of the outside air temperature outside the vehicle, based on the request signal from the main ECU 2.

The room temperature sensor 8 detects an air temperature (vehicle interior temperature) in a cabin. The room temperature sensor 8 outputs a detection value of the vehicle interior temperature in the cabin, based on the request signal from the main ECU 2.

The solar radiation sensor 9 detects an amount of solar radiation entering the cabin. That is, the solar radiation sensor 9 includes a photodiode that converts intensity of sunlight into a change in current. Thus, the solar radiation sensor 9 detects the intensity of sunlight on the vehicle. The solar radiation sensor 9 outputs a detection value of the intensity of sunlight on the vehicle, based on the request signal from the main ECU 2.

The air conditioning control unit 5 reads the detection values of the outside air temperature outside the vehicle, the vehicle interior temperature in the cabin, and the intensity of sunlight, and controls driving of the air conditioner unit 6 such that the temperature in the cabin reaches the setting temperature.

The main ECU 2 also transmits and receives signals to and from the driver information acquirer 10, the biometric information acquisition device 11, the driver collator 12, the registration information storage 13, and the control signal outputter 14.

The driver information acquirer 10 is a detection device including a driver monitoring camera (not illustrated) that captures an image of the driver 21, who is the occupant. The driver monitoring camera is provided in front of the driver seat (for example, a dashboard, an instrument panel, a rearview mirror, or the like). The driver information acquirer 10 constitutes a so-called driver monitoring system (DMS), which is a device for monitoring a driver condition.

Based on a face image of the driver 21, the driver information acquirer 10 detects non-gazing at the front due to inattentive driving, drowsiness, or the like, for each of acquired images. That is, the driver information acquirer 10 monitors a state in which eyes of the driver 21 are open, a line-of-sight direction, a posture, and the like of the driver 21, from the acquired face image of the driver 21.

In addition, the driver information acquirer 10 detects an amount of clothing of the driver 21. The driver information acquirer 10 senses, from the image, the amount of clothing being worn by the driver 21. Then, the driver information acquirer 10 performs image processing on the image of the driver 21 captured by the driver monitoring camera, and outputs the processed image as image data.

Figure 2:
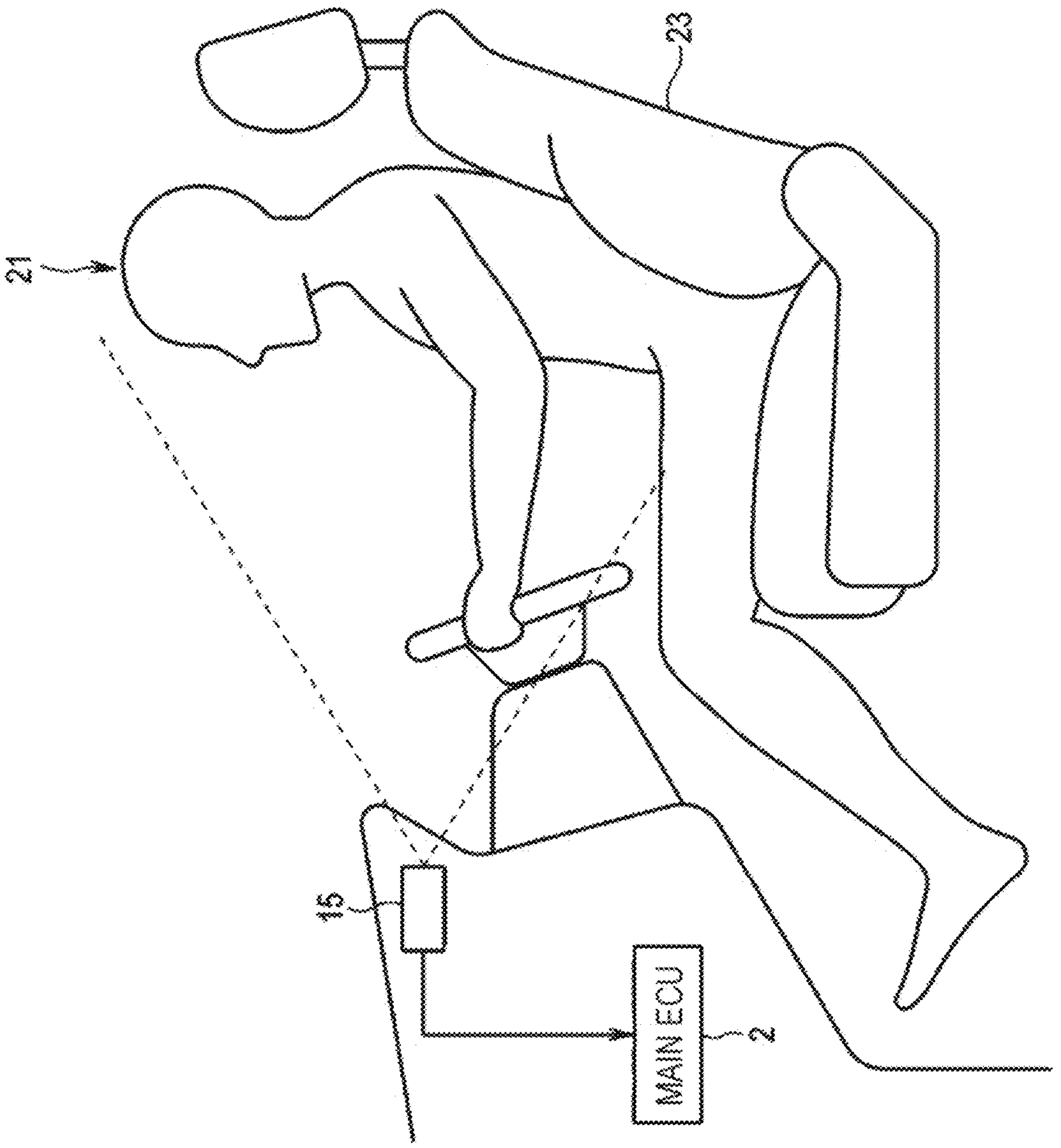
FIG. 2 is a side view schematically illustrating a state in which a driver, who is an occupant and user, is seated on a driver seat according to the aspect of the present disclosure.
Figure 3:
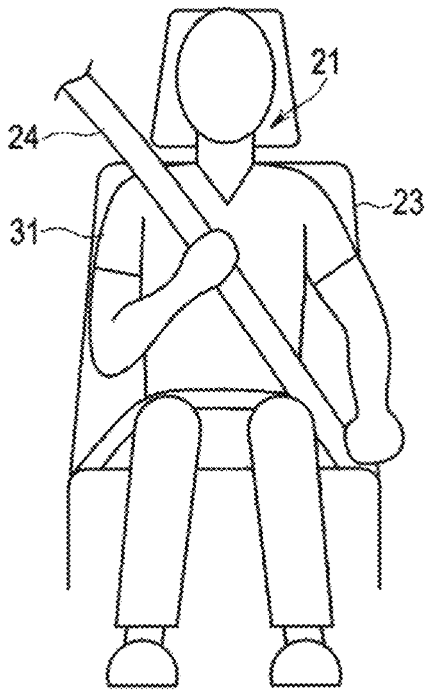
FIG. 3 is a front view schematically illustrating a state in which the driver, who is the occupant and user, wearing thin clothes such as a T-shirt is seated on the driver seat according to the aspect of the present disclosure.
Figure 4:
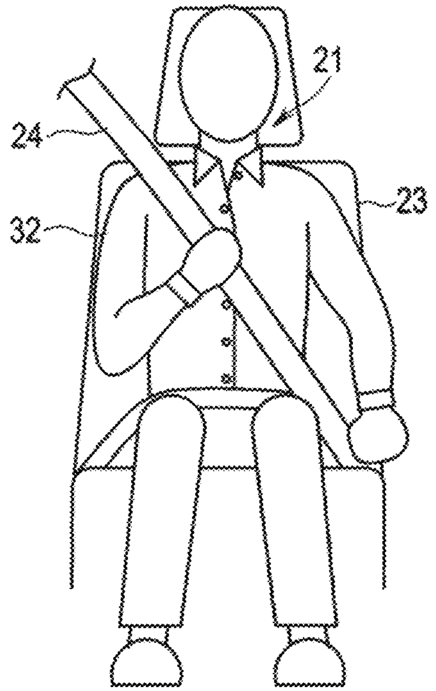
FIG. 4 is a front view schematically illustrating a state in which the driver, who is the occupant and user, wearing long-sleeved clothes such as a dress shirt is seated on the driver seat according to the aspect of the present disclosure.
Figure 5:
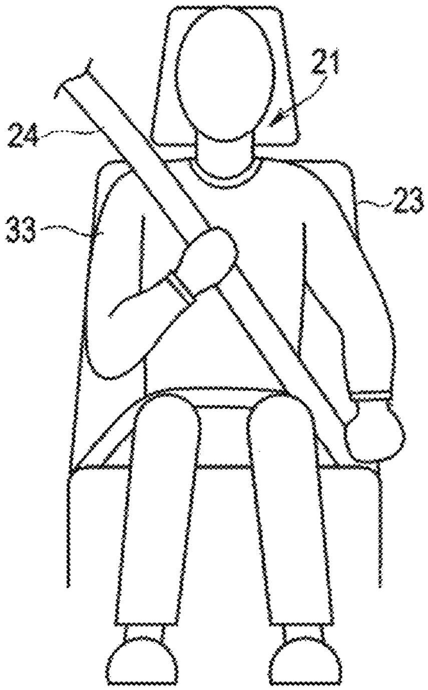
FIG. 5 is a front view illustrating a state in which the driver, who is the occupant and user, wearing thick clothes such as a sweatshirt is seated on the driver seat according to the aspect of the present disclosure.
Figure 6:
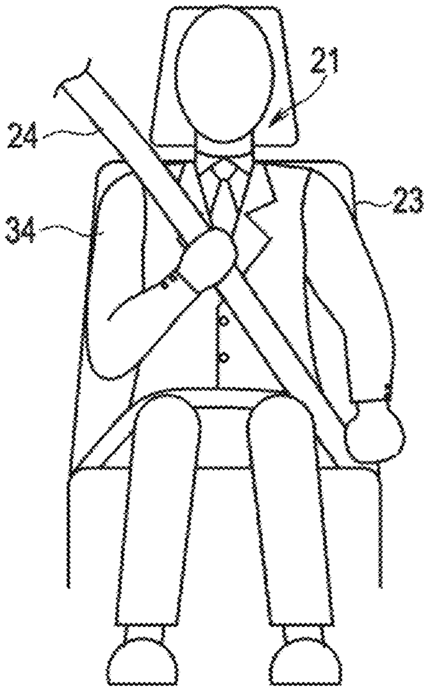
FIG. 6 is a front view illustrating a state in which the driver, who is the occupant and user, wearing outer clothes such as a jacket is seated on the driver seat according to the aspect of the present disclosure.
Figure 7:
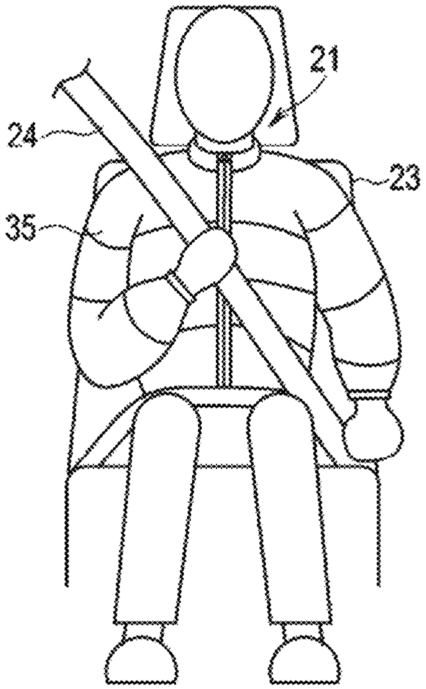
FIG. 7 is a front view illustrating a state in which the driver, who is the occupant and user, wearing winter clothes such as a down jacket is seated on the driver seat according to the aspect of the present disclosure.

The biometric information acquisition device 11 detects various kinds of biometric information such as a body temperature, a pulse, a heart rate, or an amount of perspiration of the driver 21. The biometric information acquisition device 11 is provided on, for example, a driver seat 23 (see FIG. 2). That is, the biometric information acquisition device 11 acquires the biometric information of the driver 21 seated on the driver seat 23. The biometric information acquisition device 11 then outputs the acquired various kinds of biometric information of the driver 21.

The biometric information acquisition device 11 may be an electronic device such as a smartwatch worn by the driver 21 or a smartphone carried by the driver 21. In a case where the biometric information acquisition device 11 is an electronic device such as a smartwatch or a smartphone, the biometric information acquisition device 11 transmits various kinds of acquired biometric information of the driver 21 by wireless communication such as Bluetooth (registered trademark).

The driver collator 12 reads the image data of the driver 21 acquired by the driver information acquirer 10. The driver collator 12 also reads user registration information registered in the registration information storage 13. The driver collator 12 then collates the image data with the registered user registration information by face authentication or the like of the driver 21, and outputs the collation result.

The registration information storage 13 includes a storage that is a memory (storage) such as a RAM or a ROM that stores various kinds of information on each of drivers 21 acquired by the driver information acquirer 10. The registration information storage 13 stores individual user registration information for each driver 21.

Various kinds of information are stored in the registration information storage 13 each time the driver 21 boards the vehicle. These various kinds of information are, for example, the date and time when the driver 21 boards the vehicle, the position of the vehicle, the setting temperature of the air conditioner unit 6, the outside air temperature detected by the outside air temperature sensor 7, the vehicle interior temperature detected by the room temperature sensor 8, the intensity of sunlight detected by the solar radiation sensor 9, a user ID of the occupant to be described later, a characteristic map, and the like.

The control signal outputter 14 outputs a control signal for controlling the driving of the air conditioner unit 6 by the air conditioning control unit 5, based on various kinds of information that are stored in the registration information storage 13 and that are related to the driver 21 collated by the driver collator 12.

The electric seat belt tensioner 15 is a device that winds, with an internal motor (not illustrated) or the like, a seat belt 24 (see FIGS. 3 to 7) for restraining the driver 21 seated on the driver seat 23.

The manual temperature setter 16 is provided on a control panel (not illustrated). The control panel is provided on an instrument panel or the like in the vehicle interior (cabin). The manual temperature setter 16 is an operation member with which the occupant such as the driver 21 performs various operations related to the air conditioner unit 6.

The control panel includes, in addition to the manual temperature setter 16, a main switch, an automatic mode switch, a blower speed switch, a blowing mode switch, an inside/outside air changeover switch, and the like (none of which are illustrated).

The main ECU 2 senses the amount of clothing based on a piece of clothing worn by the driver 21 in the image acquired by the driver information acquirer 10, calculates a clothing level of the driver 21, and converts the clothing level into a numerical value for example, any of 1 to 5. Examples of the piece of clothing worn by the driver 21 include thin clothes 31 such as a T-shirt illustrated in FIG. 3, long-sleeved clothes 32 such as a dress shirt illustrated in FIG. 4, thick clothes 33 such as a sweater or a sweatshirt illustrated in FIG. 5, outer clothes 34 such as a jacket illustrated in FIG. 6, winter clothes 35 such as a down jacket illustrated in FIG. 7, and the like.

In the illustrated configuration, the five (1 to 5) clothing levels of the thin clothes 31, the long-sleeved clothes 32, the thick clothes 33, the outer clothes 34, and the winter clothes 35 are detected as numerical values. However, the present disclosure is not limited thereto, and the clothing levels may be detected as numerical values such as three levels (1 to 3) and ten levels (1 to 10).

The seat belt 24 may be marked with lines, a one dimensional bar code, a two dimensional code, or the like, and the driver monitoring camera of the driver information acquirer 10 may capture an image of such marking to detect the amount of clothing of the driver 21.

The amount of clothing of the driver 21 may be detected based on a pull-out amount of the seat belt 24 by the electric seat belt tensioner 15. In this case, the electric seat belt tensioner 15 serves as a detection device that detects the amount of clothing of the occupant.

The registration information storage 13 stores air conditioner setting information for each driver 21. As illustrated in FIGS. 8 and 9, the air conditioner setting information includes a base characteristic map 25 and a personalized characteristic map 26 that are characteristic data for controlling the air conditioner unit 6 such that a setting temperature Pt corresponding to outside air temperature data Tr and clothing level data CLr is reached.

FIG. 8 is an example of the base characteristic map 25 at an initial stage. When the driver 21 is not registered in the user registration information, that is, when the driver 21 has no boarding history, the base characteristic map 25 is read into the main ECU 2. Then, the vehicle air conditioning system 1 controls the driving of the air conditioner unit 6, based on the setting temperature Pt corresponding to the outside air temperature data Tr including a detected current outside air temperature T in the base characteristic map 25 at the initial stage.

When the driver 21 has a boarding history and, for example, the user ID of the driver 21 is registered in the user registration information, the personalized characteristic map 26 of the user ID of the driver 21 illustrated in FIG. 9 is read into the main ECU 2. The personalized characteristic map 26 in FIG. 9 is also an example.

That is, in the base characteristic map 25 in FIG. 8 and the personalized characteristic map 26 in FIG. 9, ranges and sections of the outside air temperature data Tr and the clothing level data CLr are not limited. Also, the setting temperature Pt of the air conditioner unit 6 corresponding to the outside air temperature data Tr and the clothing level data CLr are not limited.

Then, the vehicle air conditioning system 1 controls the driving of the air conditioner unit 6, based on the setting temperature Pt corresponding to the outside air temperature data Tr and the clothing level data CLr in the personalized characteristic map 26 of the user ID of the driver 21. The personalized characteristic map 26 is assigned with a different user ID for each driver 21 detected and is stored in the registration information storage 13 as the air conditioner setting information of the user registration information.

Figure 10:
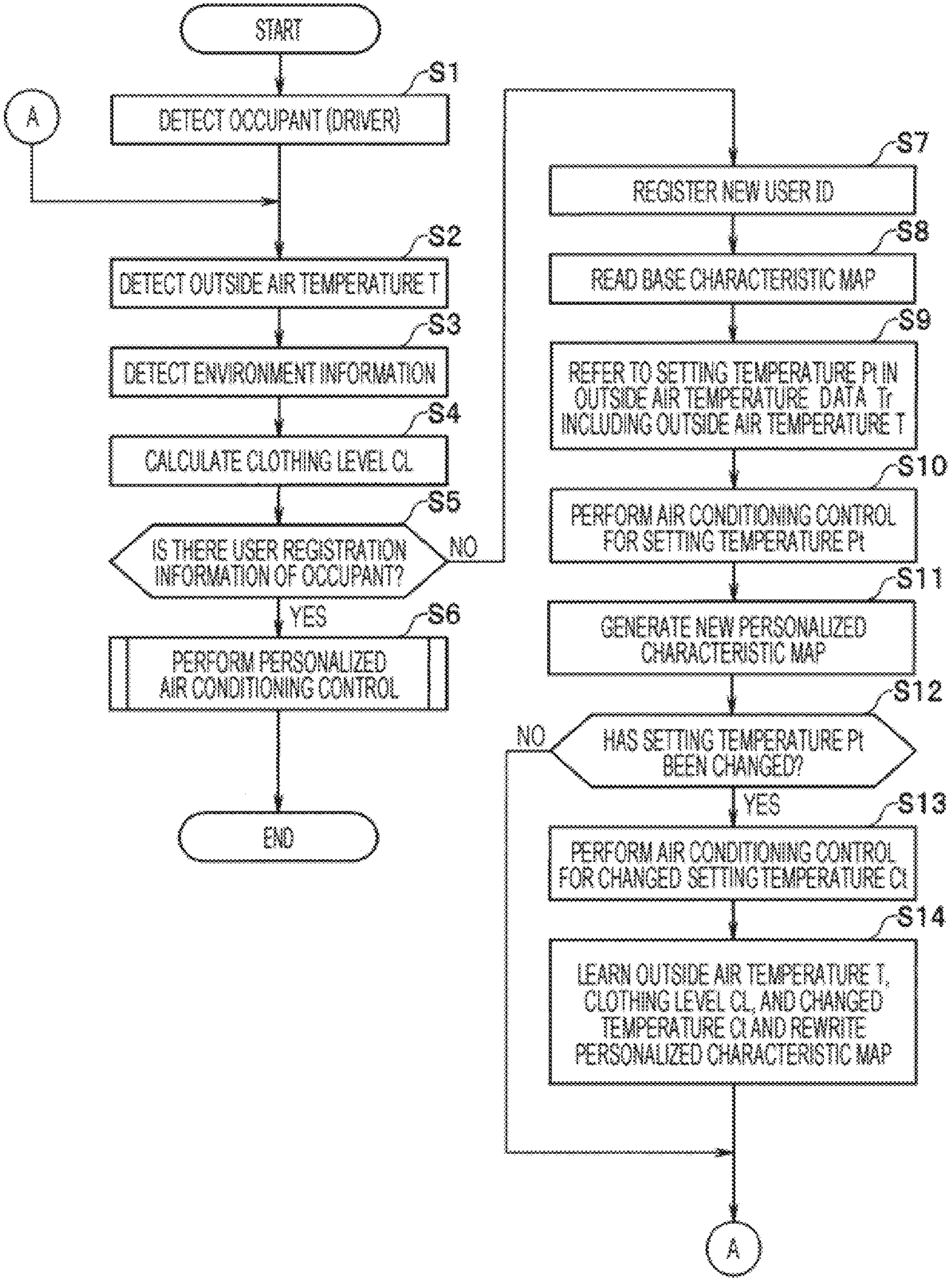
FIG. 10 is a flowchart illustrating air conditioning control performed by the vehicle air conditioning system according to the aspect of the present disclosure.
Figure 11:
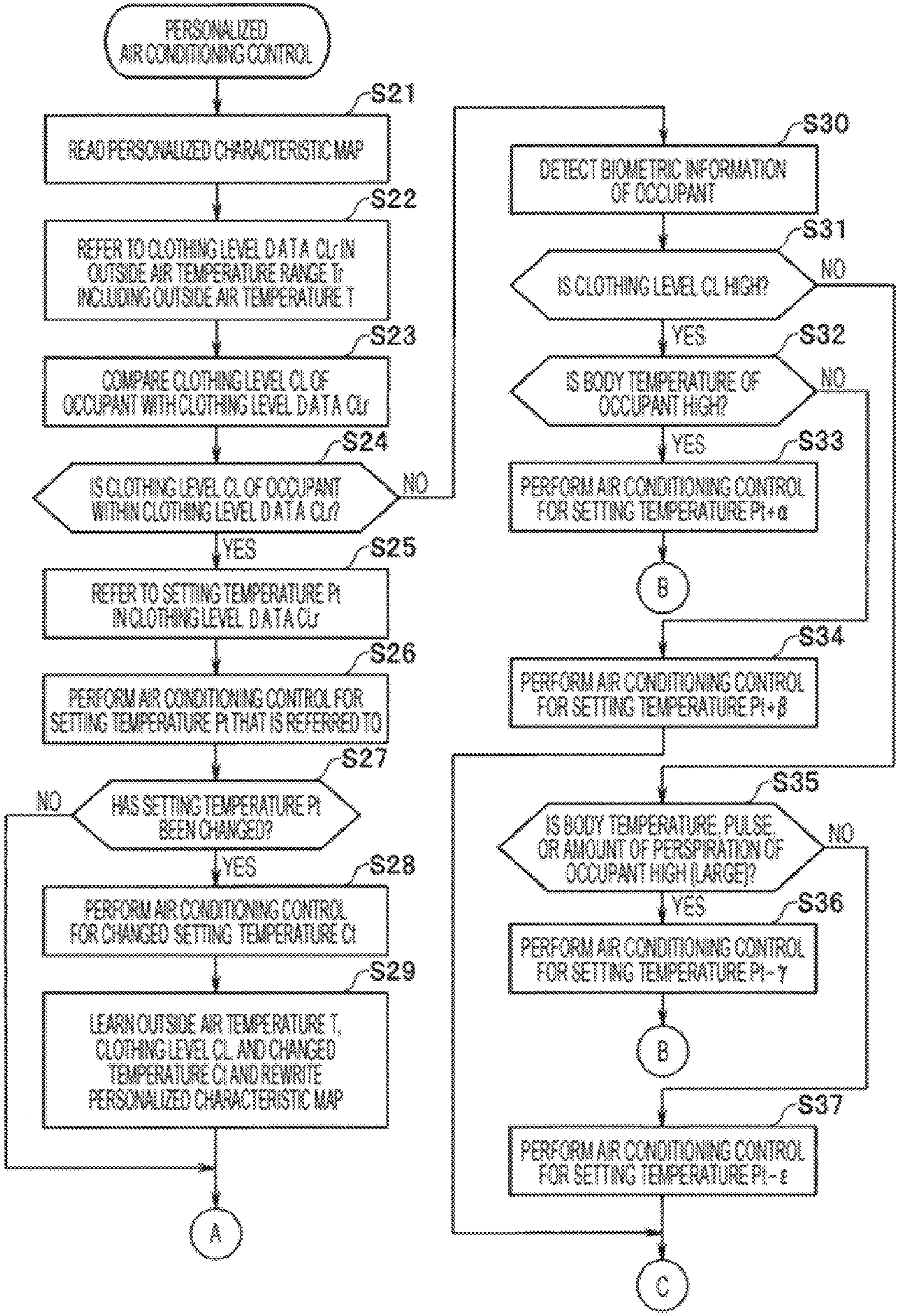
FIG. 11 is a flowchart illustrating personalized air conditioning control performed by the vehicle air conditioning system according to the aspect of the present disclosure.

The vehicle air conditioning system 1 configured as described above executes a control routine in order of steps S illustrated in the flowcharts of FIGS. 10 and 11 when the driver 21 boards the vehicle and the ignition is turned on or the engine is started.

First, the vehicle air conditioning system 1 detects the driver 21, who is the occupant (S1). The main ECU 2 detects (recognizes) the occupant from the image data of the driver 21 captured by the driver information acquirer 10, and proceeds to step S2.

The vehicle air conditioning system 1 detects the outside air temperature T (S2). The main ECU 2 detects the current air temperature (outside air temperature T) outside the vehicle, which is input from the outside air temperature sensor 7, and proceeds to step S3.

The vehicle air conditioning system 1 detects environment information (S3). The main ECU 2 detects current environment information such as the date and time, the position of the vehicle, and the altitude from the locator unit 4 and the like, and proceeds to step S4. The main ECU 2 stores these various kinds of environment information in the registration information storage 13.

The vehicle air conditioning system 1 calculates a clothing level CL of the driver 21 (S4). The main ECU 2 senses the amount of clothing of the driver 21 from the image data obtained by the driver information acquirer 10, calculates the clothing level CL converted into a numerical value, and proceeds to step S5.

The vehicle air conditioning system 1 determines whether there is user registration information of the driver 21 (occupant) (S5). The main ECU 2 determines whether the user registration information of the driver 21 is registered, based on the collation result of the driver 21 by the driver collator 12.

When the user registration information of the driver 21 is registered in the registration information storage 13 in step S5 (step S5: YES), the vehicle air conditioning system 1 proceeds to step S6 and performs personalized air conditioning control illustrated in FIG. 11 (S6). The personalized air conditioning control will be described later. That is, it is determined that the driver 21 has a boarding history of the vehicle.

On the other hand, when the user registration information of the driver 21 is not registered in the registration information storage 13 in step S5 (step S5: NO), the vehicle air conditioning system 1 proceeds to step S7 and registers a new user ID of the driver 21 (S7). That is, the main ECU 2 determines that the driver 21 does not have a boarding history of the vehicle, registers (stores), in the registration information storage 13, the user registration information (such as the user ID) from the image data of the driver 21, which is necessary for face authentication performed by the driver collator 12, and proceeds to step S8.

The vehicle air conditioning system 1 reads the base characteristic map 25 at the initial stage (S8). The main ECU 2 reads the base characteristic map 25 at the initial stage stored in the registration information storage 13, and proceeds to step S9.

The vehicle air conditioning system 1 refers to the setting temperature Pt corresponding to the outside air temperature data Tr including the detected outside air temperature T (S9). The main ECU 2 refers to the setting temperature Pt corresponding to the outside air temperature data Tr including the outside air temperature T detected in step S2 from the initial base characteristic map 25, and proceeds to step S10.

The vehicle air conditioning system 1 performs air conditioning control for the setting temperature Pt (S10). The main ECU 2 causes the air conditioning control unit 5 to control the driving of the air conditioner unit 6 such that the setting temperature Pt referred to from the base characteristic map 25 is reached, and proceeds to step S11. That is, the main ECU 2 causes the control signal outputter 14 to output the control signal for causing the air conditioning control unit 5 to control the driving of the air conditioner unit 6 such that the setting temperature Pt is reached. Thus, the air conditioning control unit 5 controls the driving of the air conditioner unit 6 such that the vehicle interior (cabin) temperature reaches the setting temperature Pt.

The vehicle air conditioning system 1 generates the new personalized characteristic map 26 (S11). The main ECU 2 generates the personalized characteristic map 26 of the driver 21 by changing the base characteristic map 25 at the initial stage, and proceeds to step S12. The newly generated personalized characteristic map 26 of the driver 21 is stored in the registration information storage 13 as the air conditioner setting information of the user registration information.

For example, the base characteristic map 25 at the initial stage in FIG. 8 is rewritten, and the personalized characteristic map 26 dedicated to the driver 21 in FIG. 9 is generated and stored in the registration information storage 13. That is, the personalized characteristic map 26 is included in the newly registered user registration information of the driver 21, and is stored in the registration information storage 13 as the air conditioner setting information corresponding to the driver 21.

The vehicle air conditioning system 1 determines whether the setting temperature Pt has been changed (S12). The main ECU 2 determines whether the setting temperature Pt of the air conditioner unit 6 has been changed by the driver 21 using the manual temperature setter 16.

When the setting temperature Pt has been changed in step S12 (step S12: YES), the vehicle air conditioning system 1 performs the air conditioning control for a changed setting temperature Ct (S13). The main ECU 2 causes the air conditioning control unit 5 to control the driving of the air conditioner unit 6 such that the changed setting temperature Ct is reached, and proceeds to step S14. That is, the air conditioning control unit 5 controls the driving of the air conditioner unit 6 such that the vehicle interior temperature reaches the changed setting temperature Ct.

In step S14, the vehicle air conditioning system 1 learns the outside air temperature T, the clothing level CL, and the changed setting temperature Ct, and rewrites the personalized characteristic map 26 (S14). Then, the vehicle air conditioning system 1 returns to the detection of the outside air temperature T in step S2, and repeats the subsequent process.

Here, in the personalized characteristic map 26, the setting temperature Pt of the air conditioner unit 6 corresponding to the outside air temperature data Tr including the current outside air temperature T and the clothing level data CLr including the clothing level CL is rewritten to the changed temperature Ct setting. In this way, the personalized characteristic map 26 of the driver 21 is changed and stored (registered) in the registration information storage 13.

When the setting temperature Pt has not been changed in step S12 (step S12: NO), the vehicle air conditioning system 1 returns to the detection of the outside air temperature T in step S2, and repeats the subsequent process.

Next, the control routine illustrated in FIG. 11 will be described in order of steps S of the personalized air conditioning control in step S6.

First, the vehicle air conditioning system 1 reads the personalized characteristic map 26 of the driver 21 (S21). The main ECU 2 reads the personalized characteristic map 26 of the driver 21 detected in step S1 from the registration information storage 13, and proceeds to step S22.

The vehicle air conditioning system 1 refers to the clothing level data CLr corresponding to the outside air temperature data Tr including the outside air temperature T (S22). The main ECU 2 refers to the clothing level data CLr corresponding to the outside air temperature data Tr including the outside air temperature T detected in step S2 from the personalized characteristic map 26, and proceeds to step S23.

The vehicle air conditioning system 1 compares the clothing level CL of the occupant with the clothing level data CLr (S23). The main ECU 2 compares the clothing level CL of the driver 21, who is the occupant, calculated in step S4 with the clothing level data CLr referred to from the personalized characteristic map 26 in step S22, and proceeds to step S24.

The vehicle air conditioning system 1 determines whether the clothing level CL of the occupant is within the clothing level data CLr (S24). The main ECU 2 determines whether the clothing level CL of the driver 21, who is the occupant, calculated in step S4 is included in the clothing level data CLr referred to from the personalized characteristic map 26.

When the clothing level CL is within the clothing level data CLr in step S24 (step S24: YES), the vehicle air conditioning system 1 refers to the setting temperature Pt corresponding to the clothing level data CLr (S25). The main ECU 2 refers to the outside air temperature data Tr including the outside air temperature T detected in step S2 and the setting temperature Pt corresponding to the clothing level data CLr corresponding to the outside air temperature data Tr from the personalized characteristic map 26, and proceeds to step S26.

The vehicle air conditioning system 1 performs the air conditioning control for the setting temperature Pt that is referred to (S26). The main ECU 2 causes the air conditioning control unit 5 to control the driving of the air conditioner unit 6 such that the setting temperature Pt referred to from the personalized characteristic map 26 is reached, and proceeds to step S27. That is, the main ECU 2 causes the control signal outputter 14 to output the control signal for causing the air conditioning control unit 5 to control the driving of the air conditioner unit 6 such that the setting temperature Pt is reached. Thus, the air conditioning control unit 5 controls the driving of the air conditioner unit 6 such that the vehicle interior temperature reaches the setting temperature Pt.

The vehicle air conditioning system 1 determines whether the setting temperature Pt has been changed (S27). The main ECU 2 determines whether the setting temperature Pt of the air conditioner unit 6 has been changed by the driver 21 using the manual temperature setter 16.

When the setting temperature Pt has been changed in step S27 (step S27: YES), as in step S13, the vehicle air conditioning system 1 performs the air conditioning control for the changed setting temperature Ct (S28). The main ECU 2 causes the air conditioning control unit 5 to control the driving of the air conditioner unit 6 such that the changed setting temperature Ct is reached, and proceeds to step S29. That is, the air conditioning control unit 5 controls the driving of the air conditioner unit 6 such that the vehicle interior temperature reaches the changed setting temperature Ct.

As in step S14, the vehicle air conditioning system 1 learns the outside air temperature T, the clothing level CL, and the changed setting temperature Ct changed by the driver 21, and rewrites the personalized characteristic map 26 (S29). Then, the vehicle air conditioning system 1 returns to the detection of the outside air temperature T in step S2, and repeats the subsequent process.

Here, in the personalized characteristic map 26, the setting temperature Pt of the air conditioner unit 6 corresponding to the outside air temperature data Tr including the current outside air temperature T and the clothing level data CLr including the clothing level CL is also rewritten to the changed setting temperature Ct. In this way, the personalized characteristic map 26 of the driver 21 is changed and stored (registered) in the registration information storage 13.

When the setting temperature Pt has not been changed in step S27 (step S27: NO), the vehicle air conditioning system 1 returns to the detection of the outside air temperature T in step S2, and repeats the subsequent process.

When the clothing level CL is not within the clothing level data CLr in step S24 (step S24: NO), the vehicle air conditioning system 1 detects the biometric information of the occupant (S30). The main ECU 2 detects the biometric information such as the body temperature, the pulse, the heart rate, or the amount of perspiration of the driver 21, who is the occupant, acquired by the biometric information acquisition device 11, and proceeds to step S31.

The vehicle air conditioning system 1 determines whether the clothing level CL is high (S31). The main ECU 2 determines whether the clothing level CL of the driver 21, who is the occupant, is higher than the clothing level data CLr corresponding to the outside air temperature data Tr including the outside air temperature T in the personalized characteristic map 26. That is, the main ECU 2 determines whether the clothing level CL of the driver 21 calculated in step S4 is higher than the clothing level data CLr corresponding to the outside air temperature data Tr including the detected outside air temperature T.

When the clothing level CL is higher than the clothing level data CLr in step S31 (step S31: YES), the vehicle air conditioning system 1 determines whether the body temperature of the occupant is high (S32). The main ECU 2 determines whether the body temperature in the biometric information of the driver 21 detected in step S30 is higher than, for example, 37.0° C. It may be determined whether the body temperature for this determination is higher than a normal body temperature (normal temperature) of each driver 21.

Figure 12:
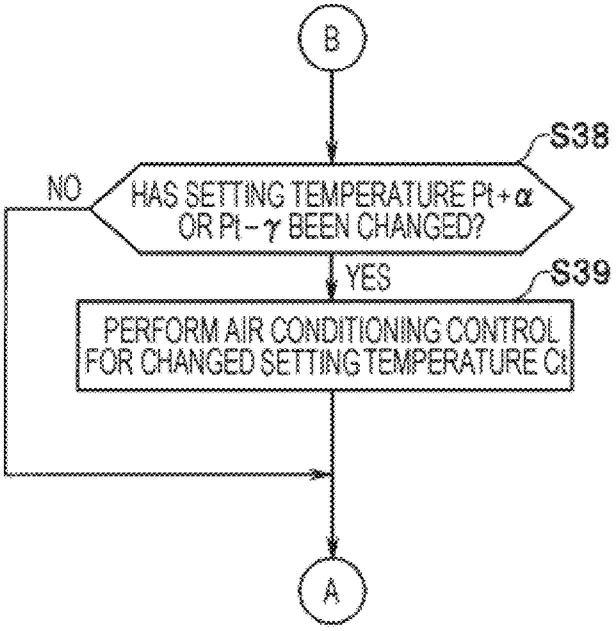
FIG. 12 is a flowchart illustrating the personalized air conditioning control subsequent to B in FIG. 11 according to the aspect of the present disclosure.

When the body temperature of the occupant is high in step S32 (step S32: YES), the vehicle air conditioning system 1 performs the air conditioning control for a setting temperature Pt+α (S33). The main ECU 2 causes the air conditioning control unit 5 to control the driving of the air conditioner unit 6 such that the setting temperature Pt+α (for example, about Pt+3 to 5° C.) is reached, and proceeds to step S38 in FIG. 12.

That is, the main ECU 2 causes the control signal outputter 14 to output the control signal for causing the air conditioning control unit 5 to control the driving of the air conditioner unit 6 such that the setting temperature Pt+α is reached. Thus, the air conditioning control unit 5 controls the driving of the air conditioner unit 6 such that the vehicle interior temperature reaches the setting temperature Pt+α.

Here, since the driver 21 wears thicker clothes than usual and the body temperature is higher than usual, it is assumed that the driver 21 is suspected to be in a poor physical condition and has fever due to a cold or the like. Therefore, the vehicle air conditioning system 1 changes the temperature setting of the air conditioner unit 6 to a temperature setting higher than the setting temperature Pt by a predetermined temperature α (for example, about +3 to 5° C.) so as not to excessively lower the vehicle interior temperature. The vehicle air conditioning system 1 may control the driving of the air conditioner unit 6 such that the vehicle interior temperature does not become lower than or equal to a predetermined temperature, for example, 23 to 25° C.

Figure 13:
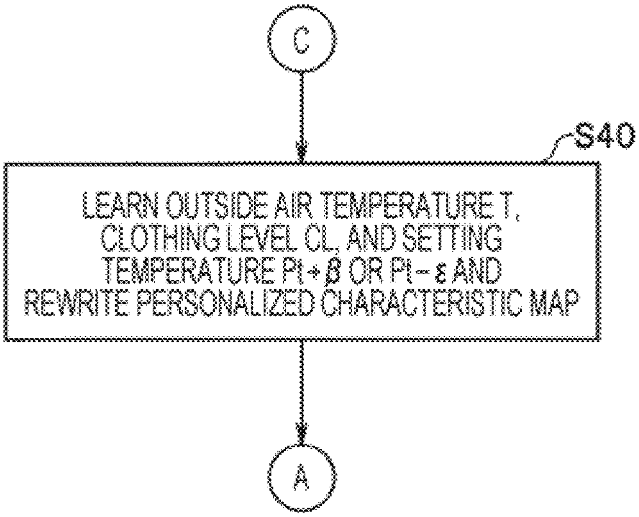
FIG. 13 is a flowchart illustrating the personalized air conditioning control subsequent to C in FIG. 11 according to the aspect of the present disclosure.

On the other hand, when the body temperature of the occupant is not high in step S32 (step S32: NO), the vehicle air conditioning system 1 performs the air conditioning control for a setting temperature Pt+β (S34). The main ECU 2 causes the air conditioning control unit 5 to control the driving of the air conditioner unit 6 such that the setting temperature Pt+β (for example, about Pt+2 to 3° C.) is reached, and proceeds to step S40 in FIG. 13.

That is, the main ECU 2 causes the control signal outputter 14 to output the control signal for causing the air conditioning control unit 5 to control the driving of the air conditioner unit 6 such that the setting temperature Pt+β is reached. Thus, the air conditioning control unit 5 controls the driving of the air conditioner unit 6 such that the vehicle interior temperature reaches the setting temperature Pt+β.

Here, it is determined that the driver 21 is not suspected to be in a poor physical condition and does not have fever due to a cold or the like, although the driver 21 wears thicker clothes than at the time of previous boarding at the outside air temperature T. That is, it is assumed that the driver 21 feels slightly cold in the vehicle interior. Therefore, the vehicle air conditioning system 1 changes the temperature setting of the air conditioner unit 6 to a temperature setting higher than the setting temperature Pt by a predetermined temperature β (for example, about +2 to 3° C.).

When the clothing level CL is not higher than the clothing level data CLr in step S31 (step S31: NO), the vehicle air conditioning system 1 determines whether the body temperature, the pulse, the heart rate, the amount of perspiration, or the like of the occupant is high (large) (S35). The main ECU 2 determines whether the body temperature, the pulse, the heart rate, the amount of perspiration, or the like in the biometric information of the driver 21, who is the occupant, detected in step S30 is higher (larger) than usual.

When the body temperature, the pulse, the heart rate, the amount of perspiration, or the like is higher (larger) than usual in step S35 (step S35: YES), the vehicle air conditioning system 1 performs the air conditioning control for a setting temperature Pt−γ (S36). The main ECU 2 causes the air conditioning control unit 5 to control the driving of the air conditioner unit 6 such that the setting temperature Pt−γ (for example, about Pt−5° C.) is reached, and proceeds to step S38 in FIG. 12.

That is, the main ECU 2 causes the control signal outputter 14 to output the control signal for causing the air conditioning control unit 5 to control the driving of the air conditioner unit 6 such that the setting temperature Pt−γ is reached. Thus, the air conditioning control unit 5 controls the driving of the air conditioner unit 6 such that the vehicle interior temperature reaches the setting temperature Pt−γ.

Here, since the driver 21 wears thinner clothes than at the time of previous boarding at the outside air temperature T, and the body temperature, the pulse, the heart rate, the amount of perspiration, or the like is high (large), for example, it is assumed that the driver 21 boards the vehicle after exercise. Therefore, the vehicle air conditioning system 1 changes the temperature setting of the air conditioner unit 6 to a temperature setting lower than the setting temperature Pt by a predetermined temperature γ (for example, about −5° C.).

On the other hand, when the body temperature, the pulse, the heart rate, the amount of perspiration, or the like is not high (large) in step S35 (step S35: NO), the vehicle air conditioning system 1 performs the air conditioning control for a setting temperature Pt−ε (S37). The main ECU 2 causes the air conditioning control unit 5 to control the driving of the air conditioner unit 6 such that the setting temperature Pt−ε (for example, about Pt−2 to 3° C.) is reached, and proceeds to step S40 in FIG. 13. That is, the air conditioning control unit 5 controls the driving of the air conditioner unit 6 such that the vehicle interior temperature reaches the setting temperature Pt−ε.

That is, the main ECU 2 causes the control signal outputter 14 to output the control signal for causing the air conditioning control unit 5 to control the driving of the air conditioner unit 6 such that the setting temperature Pt−ε is reached. Thus, the air conditioning control unit 5 controls the driving of the air conditioner unit 6 such that the vehicle interior temperature reaches the setting temperature Pt−ε.

Here, since the driver 21 wears thinner clothes than at the time of the previous boarding at the outside air temperature T, and the body temperature, the pulse, the heart rate, the amount of perspiration, or the like is the same as usual, it is assumed that the driver 21 feels slightly hot. Therefore, the vehicle air conditioning system 1 changes the temperature setting of the air conditioner unit 6 to a temperature setting lower than the setting temperature Pt by a predetermined temperature ε (about −2 to 3° C.).

In step S38, the vehicle air conditioning system 1 determines whether the setting temperature Pt+a in step S33 or the setting temperature Pt−γ in step S36 has been changed (S38). The main ECU 2 determines whether the setting temperature Pt+a or the setting temperature Pt−γ of the air conditioner unit 6 has been changed by the driver 21 using the manual temperature setter 16.

When the setting temperature Pt+α or the setting temperature Pt−γ has been changed in step S38 (step S38: YES), as in step S13 and S28, the vehicle air conditioning system 1 performs the air conditioning control for the changed setting temperature Ct (S39). The main ECU 2 causes the air conditioning control unit 5 to control the driving of the air conditioner unit 6 such that the changed setting temperature Ct is reached, and returns to the detection of the outside air temperature T in step S2. That is, the air conditioning control unit 5 controls the driving of the air conditioner unit 6 such that the vehicle interior temperature reaches the changed setting temperature Ct.

When the setting temperature Pt+α or the setting temperature Pt−γ has not been changed in step S38 (step S38: NO), the vehicle air conditioning system 1 returns to the detection of the outside air temperature T in step S2, and repeats the subsequent process.

In step S40, as in step S14 and S29, the vehicle air conditioning system 1 learns the outside air temperature T, the clothing level CL, and the setting temperature Pt+β or the setting temperature Pt−ε changed by the driver 21, and rewrites the personalized characteristic map 26 (S40). Then, the vehicle air conditioning system 1 returns to the detection of the outside air temperature T in step S2, and repeats the subsequent process.

Here, in the personalized characteristic map 26, the setting temperature Pt of the air conditioner unit 6 corresponding to the outside air temperature data Tr including the current outside air temperature T and the clothing level data CLr including the clothing level CL is also rewritten to the setting temperature Pt+β or the setting temperature Pt−ε. In this way, the personalized characteristic map 26 of the driver 21 is changed and stored (registered) in the registration information storage 13.

As described above, in a case of the driver 21 who has boarded the vehicle before, the vehicle air conditioning system 1 according to the present embodiment controls the driving of the air conditioner unit 6 such that the setting temperature Pt corresponding to the outside air temperature data Tr and the clothing level data CLr in the personalized characteristic map 26 is reached, based on the outside air temperature T and the clothing level CL from the amount of clothing of the driver 21. That is, when the amount of clothing does not change at the outside air temperature T that is the same as the outside air temperature T at the previous time the driver 21 has boarded the vehicle, the vehicle air conditioning system 1 reproduces the setting temperature Pt at that time and controls the driving of the air conditioner unit 6.

In a case of the driver 21 who has not boarded the vehicle before, the vehicle air conditioning system 1 controls the driving of the air conditioner unit 6 such that the setting temperature Pt corresponding to the outside air temperature data Tr in the base characteristic map 25 is reached, based on the outside air temperature T. Then, the vehicle air conditioning system 1 generates and saves (stores) the base characteristic map 25 as the personalized characteristic map 26 of the driver 21.

When the driver 21 is suspected to be in a poor physical condition, after exercise, or the like, the vehicle air conditioning system 1 changes the setting temperature Pt to a predetermined temperature (Pt+α or Pt−γ) and controls the driving of the air conditioner unit 6.

Unlike in the previous boarding, the clothing level CL of the driver 21 may be changed from the clothing level data CLr corresponding to the outside air temperature data Tr in the personalized characteristic map 26 including the outside air temperature T at that time, or the setting temperature Pt may be changed to the changed setting temperature Ct. In such a case, the vehicle air conditioning system 1 stores the personalized characteristic map 26 in which the clothing level data CLr is rewritten to the clothing level data CLr including the changed clothing level CL and the setting temperature Pt is rewritten to the changed setting temperature Ct. Thus, next time the driver 21 boards the vehicle, the vehicle air conditioning system 1 reproduces the setting temperature Pt based on the rewritten personalized characteristic map 26 and controls the driving of the air conditioner unit 6.

The outside air temperature T may be less than or equal to a certain value in the outside air temperature data Tr as compared with previous boarding and the clothing level CL of the driver 21 may be included in the clothing level data CLr corresponding to the outside air temperature data Tr. In such a case, the vehicle air conditioning system 1 controls the driving of the air conditioner unit 6 such that the same setting temperature Pt as that of previous boarding is reached. That is, when there is no change in the amount of clothing of the driver 21 at the outside air temperature T, the vehicle air conditioning system 1 controls the driving of the air conditioner unit 6 such that the setting temperature Pt based on the same situation (scene) as that of previous boarding is reached.

When the outside air temperature T is less than or equal to the certain value in the outside air temperature data Tr as compared with previous boarding but the clothing level CL of the driver 21 is high and the driver 21 wears thick clothes, the vehicle air conditioning system 1 determines that the driver 21 feels slightly cold. Thus, the vehicle air conditioning system 1 controls the driving of the air conditioner unit 6 such that the driving is slightly weakened in a case of cooling and slightly strengthened in a case of heating by changing the temperature setting of the air conditioner unit 6 to the temperature setting higher than the setting temperature Pt, by the predetermined temperature β, in the same situation (scene) as that of previous boarding.

When the outside air temperature T is less than or equal to the certain value in the outside air temperature data Tr as compared with previous boarding but the clothing level CL of the driver 21 is low and the driver 21 wears thin clothes, the vehicle air conditioning system 1 determines that the driver 21 feels slightly hot. Thus, the vehicle air conditioning system 1 controls the driving of the air conditioner unit 6 such that the driving is slightly strengthened in a case of cooling and slightly weakened in a case of heating by changing the temperature setting of the air conditioner unit 6 to the temperature setting lower than the setting temperature Pt, by the predetermined temperature ε, in the same situation (scene) as that of previous boarding.

In this manner, when the amount of clothing of the driver 21 at the outside air temperature T is different from that of previous boarding, the vehicle air conditioning system 1 changes the setting temperature of the air conditioner unit 6 to control the strength of cooling and heating. The vehicle air conditioning system 1 may stop the air conditioner unit 6 to turn off cooling and heating depending on the situation of the outside air temperature T and the amount of clothing of the driver 21.

Each time the driver 21 boards the vehicle, the vehicle air conditioning system 1 learns the clothing level data CLr including the clothing level CL obtained by converting the amount of clothing of the driver 21 into a numerical value and the setting temperature Pt of the air conditioner unit 6 corresponding to the outside air temperature data Tr including the outside air temperature T. Also, the vehicle air conditioning system 1 rewrites (updates) and stores the personalized characteristic map 26 of the driver 21.

The vehicle air conditioning system 1 repeatedly executes the routine in step S4 in FIG. 10 to calculate the clothing level CL of the amount of clothing even when the driver 21 takes off clothes to wear thin clothes or puts on clothes to wear thick clothes while boarding. Therefore, the vehicle air conditioning system 1 varies the setting temperature Pt of the air conditioner unit 6 in accordance with the change in the amount of clothing of the driver 21.

When it is assumed, from the body temperature of the biometric information of the driver 21, that the driver 21 is in a poor physical condition or has fever due to a cold or the like, the vehicle air conditioning system 1 controls the driving of the air conditioner unit 6 such that the driving is slightly weakened in a case of cooling and slightly strengthened in a case of heating by changing the temperature setting of the air conditioner unit 6 to the temperature setting higher than the setting temperature Pt by the predetermined temperature $\alpha$.

That is, the vehicle air conditioning system 1 does not excessively lower the vehicle interior temperature. The vehicle air conditioning system 1 may vary an air flow direction of the air conditioner unit 6 such that the air does not directly hit the driver 21.

It may be assumed that the driver 21 is after exercise or the like, based on the body temperature, the pulse, the heart rate, the amount of perspiration, or the like of the biometric information of the driver 21. In such a case, the vehicle air conditioning system 1 controls the driving of the air conditioner unit 6 such that the driving is slightly strengthened in a case of cooling and slightly weakened in a case of heating by changing the temperature setting of the air conditioner unit 6 to the temperature setting lower than the setting temperature Pt by the predetermined temperature $\gamma$.

In this manner, the vehicle air conditioning system 1 refers to, from the personalized characteristic map 26 stored for each driver 21, the setting temperature Pt of the air conditioner unit 6 based on the amount of clothing of the driver 21 at the outside air temperature T at the time of previous boarding, and controls the driving of the air conditioner unit 6 such that the setting temperature Pt is reached. The vehicle air conditioning system 1 also learns the amount of clothing (clothing level CL) of the driver 21 and the setting temperature Pt of the air conditioner unit 6 at the outside air temperature T each time the driver 21 boards the vehicle, and rewrites (updates) the personalized characteristic map 26. That is, the vehicle air conditioning system 1 sets the vehicle interior temperature in accordance with the preference of the driver 21, based on the difference in clothes at the outside air temperature T.

As described above, the vehicle air conditioning system 1 is configured to change the vehicle interior temperature in consideration of the difference in clothes of the driver 21, who is the occupant, at the outside air temperature T at the time of boarding the vehicle.

The main ECU 2 and the air conditioning control unit 5 include a processor including a central processing unit (CPU), a storage device such as a ROM or a RAM, and the like. All or some of circuits of the processor may be implemented by software. For example, the CPU may read and execute various programs corresponding to the functions stored in the ROM. Furthermore, all or some of the functions of the processor may be implemented by a logic circuit or an analog circuit, and the processing of various programs may be implemented by an electronic circuit such as a field programmable gate array (FPGA).

The disclosure described in the above embodiment is not limited to the above embodiment, and various modifications can be made without departing from the scope of the disclosure in an execution stage. Furthermore, the above-described embodiment includes disclosures in various stages, and various disclosures can be extracted by appropriately combining disclosed components.

For example, even when some of the components are removed from all the components described in the embodiment, as long as the described problem can be solved and the described effects can be obtained, and the configuration without the components can be extracted as a disclosure.

According to the present disclosure, it is possible to provide the vehicle air conditioning system that changes the vehicle interior temperature in consideration of the clothes of the occupant at the time of boarding.

The invention claimed is:

1. A vehicle air conditioning system for a vehicle, the vehicle air conditioning system comprising:
- an air conditioner unit;
- a temperature sensor configured to detect an outside air temperature that is a current air temperature outside the vehicle;
- a detection device configured to detect an occupant of the vehicle;
- a storage configured to store characteristic data that is generated for the occupant, the characteristic data comprising: (i) clothing level data indicating an amount of clothing of the occupant as a numerical value, (ii) a setting temperature of the air conditioner unit corresponding to outside air temperature data, and (iii) a personalized characteristic map that correlates the clothing level data with the setting temperature for each of a plurality of outside air temperature ranges; and
- a controller configured to:
  - calculate a clothing level of the occupant detected by the detection device as a numerical value indicating an amount of clothing of the occupant,
  - compare the calculated clothing level with the clothing level data in the personalized characteristic map, the clothing level data in the personalized characteristic map corresponding to an outside air temperature range of the plurality of outside air temperature ranges that includes the outside air temperature which is input from the temperature sensor, and
  - control driving of the air conditioner unit by referring to a corresponding setting temperature from the personalized characteristic map that corresponds to the calculated clothing level.

2. The vehicle air conditioning system according to claim 1, wherein the controller is configured to learn, for the occupant, the setting temperature and the clothing level data comprising the clothing level corresponding to the outside air temperature range that includes the outside air temperature in the personalized characteristic map, and rewrite the personalized characteristic map.

3. The vehicle air conditioning system according to claim 1, wherein the controller is configured to, when the setting temperature of the air conditioner unit is changed by the occupant, learn a changed temperature as the setting temperature and rewrite the characteristic data.

4. The vehicle air conditioning system according to claim 2, wherein the controller is configured to, when the setting temperature of the air conditioner unit is changed by the occupant, learn a changed temperature as the setting temperature and rewrite the characteristic data.

5. The vehicle air conditioning system according to claim 1, further comprising a biometric information acquisition device configured to acquire biometric information of the occupant and output the biometric information to the controller, wherein the controller is configured to:

when the biometric information indicates a body temperature of the occupant is high, change a temperature setting of the air conditioner unit to a first temperature setting higher than the setting temperature of the air conditioner unit by a predetermined first temperature, and when the body temperature, a pulse, or a heart rate of the occupant is high and an amount of perspiration is large, change the temperature setting of the air conditioner unit to a second temperature setting lower than the setting temperature of the air conditioner unit by a predetermined second temperature.

6. The vehicle air conditioning system according to claim 2, further comprising a biometric information acquisition device configured to acquire biometric information of the occupant and output the biometric information to the controller, wherein the controller is configured to:

when the biometric information indicates a body temperature of the occupant is high, change a temperature setting of the air conditioner unit to a first temperature setting higher than the setting temperature of the air conditioner unit by a predetermined first temperature, and when the body temperature, a pulse, or a heart rate of the occupant is high and an amount of perspiration is large, change the temperature setting of the air conditioner unit to a second temperature setting lower than the setting temperature of the air conditioner unit by a predetermined second temperature.

7. The vehicle air conditioning system according to claim 1, wherein the storage is further configured to store a base characteristic map, and wherein the controller is configured to, when the occupant is detected for a first time, control driving of the air conditioner unit based on the base characteristic map and generate the personalized characteristic map for the occupant based on the base characteristic map.

8. The vehicle air conditioning system according to claim 1, wherein the numerical value indicating the amount of clothing of the occupant is one of a plurality of discrete clothing level values corresponding to different types of clothing.

9. The vehicle air conditioning system according to claim 1, wherein the controller is configured to calculate the clothing level based on a pull-out amount of a seat belt.

10. A vehicle air conditioning system comprising for a vehicle, the vehicle air conditioning system:

an air conditioner;

a temperature sensor configured to detect an outside air temperature that is a current air temperature outside the vehicle;

a detection device comprising a camera and configured to detect an occupant of the vehicle;

a memory configured to store characteristic data that is generated for the occupant, the characteristic data comprising: (i) clothing level data indicating an amount of clothing of the occupant as a numerical value, (ii) a setting temperature of the air conditioner corresponding to outside air temperature data, and (iii) a personalized characteristic map that correlates the clothing level data with the setting temperature for each of a plurality of outside air temperature ranges; and a processor configured to:

calculate a clothing level of the occupant detected by the detection device as a numerical value indicating an amount of clothing of the occupant, compare the calculated clothing level with the clothing level data in the personalized characteristic map, the clothing level data in the personalized characteristic map corresponding to an outside air temperature range of the plurality of outside air temperature ranges that includes the outside air temperature which is input from the temperature sensor, and control driving of the air conditioner by referring to a corresponding setting temperature from the personalized characteristic map that corresponds to the calculated clothing level.

11. The vehicle air conditioning system according to claim 10, wherein the memory is further configured to store a base characteristic map, and wherein the controller is configured to, when the occupant is detected for a first time, control driving of the air conditioner based on the base characteristic map and generate the personalized characteristic map for the occupant based on the base characteristic map.

12. The vehicle air conditioning system according to claim 10, wherein the numerical value indicating the amount of clothing of the occupant is one of a plurality of discrete clothing level values corresponding to different types of clothing.

13. A vehicle air conditioning system for a vehicle, the vehicle air conditioning system comprising:

an air conditioner unit;

a temperature sensor configured to detect an outside air temperature that is a current air temperature outside the vehicle;

a detection device configured to detect an occupant of the vehicle;

a biometric information acquisition device configured to acquire biometric information of the occupant;

a storage configured to store a personalized characteristic map in association with the occupant, the personalized characteristic map associating, with each of a plurality of temperature ranges having different values from one another, (i) a clothing level range and (ii) a setting temperature, the clothing level range indicating a numerical range of clothing levels, and the clothing level indicating an amount of clothing as a numerical value; and a controller configured to:

control the air conditioner unit based on a target temperature;

in response to detection of the occupant by the detection device, calculate a current clothing level of the detected occupant;

read, from the storage, the personalized characteristic map associated with the detected occupant;

based on the read personalized characteristic map, select a first temperature range from among the plurality of temperature ranges, the first temperature range including the current outside air temperature detected by the temperature sensor;

determine whether the current clothing level is within a first clothing level range, the first clothing level range being associated with the selected first temperature range in the read personalized characteristic map;

in response to determining that the current clothing level is within the first clothing level range, control the air conditioner unit using a first setting temperature as the target temperature, the first setting temperature being associated with the selected first temperature range in the read personalized characteristic map;

in response to determining that the current clothing level is not within the first clothing level range, determine, based on the first setting temperature and the biometric information, a second setting temperature different from the first setting temperature; and in response to determining the second setting temperature, control the air conditioner unit using the second setting temperature as the target temperature.

14. The vehicle air conditioning system according to claim 13, wherein the controller is configured to:

in response to determining that the current clothing level is not within the first clothing level range, determine whether the current clothing level is higher than the first clothing level range;

in response to determining that the current clothing level is higher than the first clothing level range, determine, based on the biometric information, whether a body temperature of the occupant is higher than a first predetermined value;

in response to determining that the body temperature is higher than the first predetermined value, execute a first determination process of determining the second setting temperature to be a value obtained by adding a first value to the first setting temperature, the first value being a positive value;

in response to determining that the body temperature is not higher than the first predetermined value, execute a second determination process of determining the second setting temperature to be a value obtained by adding a second value to the first setting temperature, the second value being a positive value smaller than the first value;

in response to determining that the current clothing level is not higher than the first clothing level range, determine, based on the biometric information, whether the body temperature of the occupant is higher than a second predetermined value;

in response to determining that the body temperature is higher than the second predetermined value, execute a third determination process of determining the second setting temperature to be a value obtained by subtracting a third value from the first setting temperature, the third value being a positive value; and in response to determining that the body temperature is not higher than the second predetermined value, execute a fourth determination process of determining the second setting temperature to be a value obtained by subtracting a fourth value from the first setting temperature, the fourth value being a positive value smaller than the third value.

15. The vehicle air conditioning system according to claim 14, wherein the controller is configured to:

when the target temperature is changed by the occupant from the second setting temperature determined by execution of the second determination process or execution of the fourth determination process to a third setting temperature, execute a rewriting process of the stored personalized characteristic map so as to change, to the third setting temperature, a value of the setting temperature associated with the selected first temperature range in the read personalized characteristic map; and when the target temperature is changed by the occupant from the second setting temperature determined by execution of the first determination process or execution of the third determination process to the third setting temperature, not execute the rewriting process of the stored personalized characteristic map.

16. The vehicle air conditioning system according to claim 13, wherein the controller is configured to calculate the clothing level based on a pull-out amount of a seat belt.

17. The vehicle air conditioning system according to claim 14, wherein the controller is configured to calculate the clothing level based on a pull-out amount of a seat belt.

18. The vehicle air conditioning system according to claim 15, wherein the controller is configured to calculate the clothing level based on a pull-out amount of a seat belt.

* * * * *